April 14, 1959  F. BRILL ET AL  2,881,713
RAIL VEHICLE WITH LOW PLATFORM
Filed Oct. 1, 1956  4 Sheets-Sheet 2

*Inventor:*
Fritz Brill
  and
Karl Raab
BY: Michael S. Striker
  Agt.

April 14, 1959  F. BRILL ET AL  2,881,713
RAIL VEHICLE WITH LOW PLATFORM
Filed Oct. 1, 1956  4 Sheets-Sheet 3
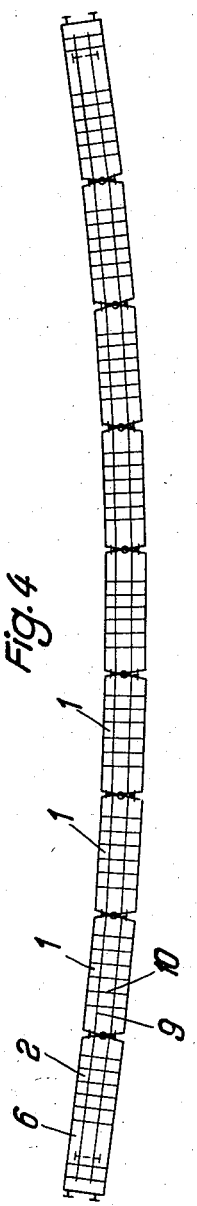
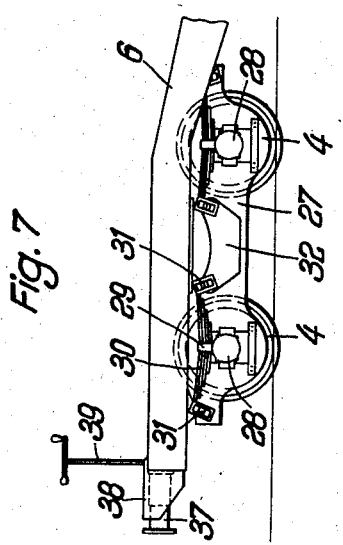
Inventors
Fritz Brill and
Karl Raab
by: Michael S. Strike
Attorney April 14, 1959     F. BRILL ET AL     2,881,713
RAIL VEHICLE WITH LOW PLATFORM
Filed Oct. 1, 1956     4 Sheets-Sheet 4
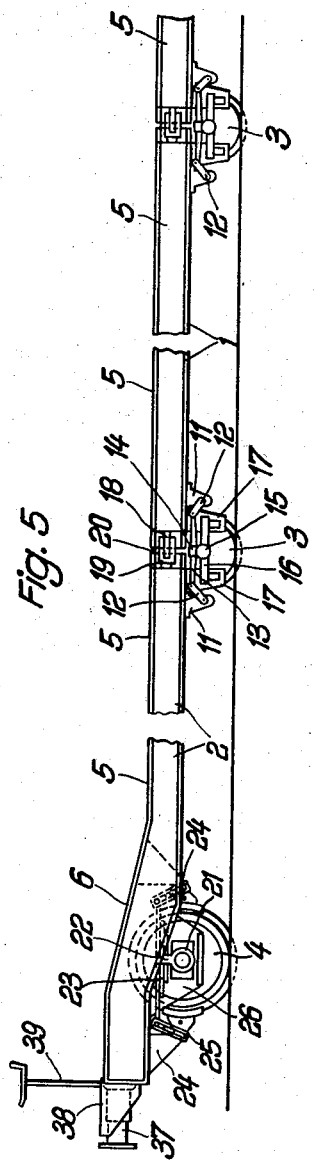
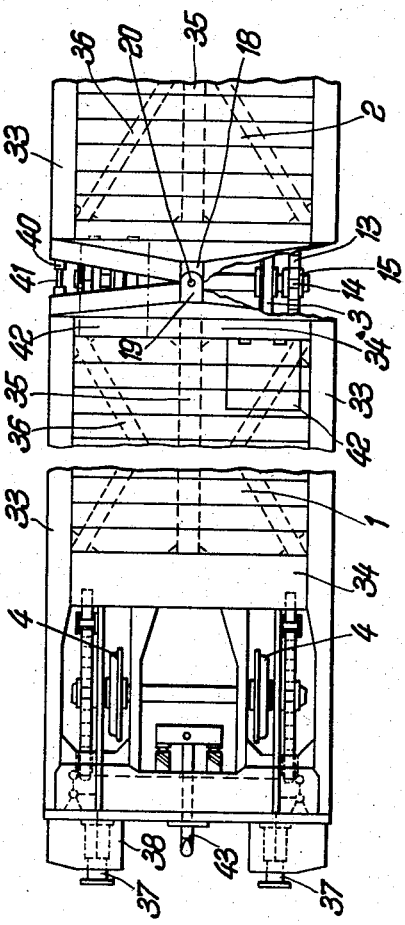
Inventors
Fritz Brill and
Karl Raab
by: Michael S. Striker
Attorney

2,881,713

RAIL VEHICLE WITH LOW PLATFORM

Fritz Brill, Siegen, Westphalia, and Karl Raab, Minden, Westphalia, Germany, assignors to Rheinstahl Siegener Eisenbahnbedarf Aktiengesellschaft, Dreis-Tiefenbach, Kreis Siegen, Germany Application October 1, 1956, Serial No. 613,042

Claims priority, application Germany October 1, 1955

5 Claims. (Cl. 105—4)

The invention relates to a rail vehicle with low platform composed of a plurality of sections arranged one behind the other, especially for express or high-speed traffic on tracks on which sets of wheels of sub-standard size are no longer safe against derailment when running over the gaps of points and crossings.

Multi-section rail vehicles are known in which single or multiple axle runner aggregates are arranged under the points where the sections of the undercarriage join. It is likewise known to guide their sets of wheels radially. By this means multi-section trains run smoothly in the curves and with relatively little wear on the wheel flanges.

It is also known that the wheel diameter of the rail vehicles cannot be made as small as may be desired in view of the running over points and crossings as these have gaps with no means of guiding.

An investigation of the conditions in the case of trains has shown, however, that Derailment of a set of wheels can only occur in a track gap when the angle of intersection is sufficiently large, for example in the case of short wheel bases in bogies with sets of wheels guided without play or when the gaps without guiding means occur in curves in the track. In the case of radially guided wheel sets, however, such an angle of intersection occurs neither on straight stretches nor when negotiating curves. Under these circumstances, therefore, it is possible to choose a wheel diameter which is smaller than would otherwise be permissible. However, the wheel diameter of the leading wheel sets of the vehicles are not chosen smaller than the standard permissible size, for example 840 millimetres, as long as the problem of their radial steering has not been solved in a satisfactory manner. It is likewise possible to imagine the steering of the first and last axles or the leading and tailing runner aggregates. The simplest and most economical solution at the moment is therefore to make them sufficiently large.

The fact that in the case of small wheel diameters the number of revolutions of the wheel sets and the stressing of the bearings increases, especially at high speeds, is of no significance to-day now that roller bearings have been generally introduced.

On the other hand the reduction of the wheel diameter has a very advantageous effect on the construction of the vehicles. The following advantages result therefrom:

(1) The platform of the rail vehicle can be kept lower in the region of the wheel sets so that it is far below the rail clearance which is usual at the present time. Constructional height is thereby gained as well as loading height.

(2) The uncushioned weight of the wheel sets can be reduced. Thus the stressing of the superstructure and the vehicles becomes less.

(3) The dead weight of the entire vehicle is less. As a result a saving in running expenses is attained.

According to the invention a rail vehicle with a low platform composed of a plurality of sections arranged one behind the other, is constructed, particular for express or high-speed service on tracks on which sets of wheels of a diameter smaller than that normally permitted are no longer safe against derailment when running over points and crossings, in such a manner that by the simultaneous arrangement of intermediate runner aggregates with radially adjustable runner aggregates under the joints between the sections, equipped with sets of wheels having a diameter which is considerably, at least 10%, smaller than the standard and permissible size, and guide runner aggregates at the ends of the section train with a tire diameter which ensures safety against derailment when running over crossings and points, that is squal to or larger than the standard or permissible size. The wheel diameter for the intermediate runner aggregates is made as small as possible, for example a diameter of 600 millimetres can be chosen for new aggregates. In the case of 50 millimetres tire wear the diameter would decrease to 500 millimetres. Even at this diameter with the usual wheel base of 2000 millimetres, standard axle bearing housings can be fitted without exceeding the clearance gauge.

The provision of wheels of smaller diameter is very desirable because, as a rule but especially in the case of multi-section articulated trains, they offer many and important advantages. In the case of long articulated trains, the height of the floor can be lowered for example along the entire length. Only at the ends of the trains it is necessary, in view of the ample buffer lever of 1600 millimetres prescribed and the larger wheel diameter necessary at this point, to raise the height of the platform, while otherwise a floor height of 500 to 700 millimetres can be attained for example with wheel diameters of 500 to 600 millimetres. The normal floor height of trains running to-day is about 1230 millimetres, so that a considerable lowering is achieved by using the small wheel diameters according to the invention. As the rolling stock clearance gauges are generally fixed, a considerable gain in height of the vehicle or of the goods carried is attained by lowering the height of the floor according to the invention.

Several embodiments of the invention are hereinafter described by way of example with reference to the accompanying drawings, in which:

Fig. 4 is a plan view of the articulated train shown in Fig. 1;

Fig. 5 is a fragmentary side view illustrating a train section of the embodiment of Fig. 1 on an enlarged scale;

Fig. 6 is a fragmentary plan view of the train section shown in Fig. 5; and

Fig. 7 is a side view illustrating a detail of the embodiment of Fig. 2 on an enlarged scale.

Figure 1:
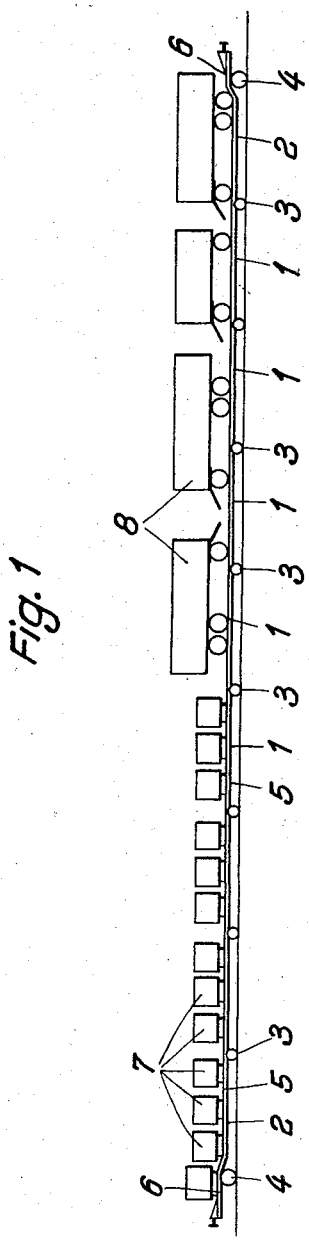
Fig. 1 shows an articulated train according to the invention in side elevation.

In Figs. 1 and 4 the train is composed of separate sections 1. At the front and rear ends of the train stepped end sections 2 are arranged. Under the points where the sections join, runner wheels 3 of small diameter are mounted on trucks so that they are radially guided. Instead of separate axles, bogies can be provided which must also be radially steered. The first and last end sections 2 of the entire train have at their ends larger wheels 4. These runner wheels are preferably of a standard diameter usually employed in service. Whereas the articulated platform 5 of the train is lowered practically along its entire length to such an extent that it corresponds to the smaller diameter of the wheels 3, it is raised at the points 6 at the front and rear ends to such an extent that it corresponds wtih the diameter of the larger runner wheels 4. The train is loaded with different kinds of containers 7 and vehicles 8. If the articulated platform train has a specific weight of 2.5 tons per section, which appears absolutely possible, the cars can carry three large containers 7 with a gross weight of 5 tons and a specific weight of 0.8 ton. For example each car can carry two two-axle road vehicles 8 with the axle pressure of 8 tons permissible under the road traffic regulations or vehicles with several axles with smaller axle pressure. Based on the load tonnage, a very low dead weight for house-to-house transport is attained for conveying on rails in the case of a light articulated train. When transporting large containers this amounts to 0.3 ton per ton of freight and in the case of three-axle road trailers about 0.68 ton per ton of the load. Also in the case of a combined shipment of containers of all kinds and ordinary road vehicles a great saving is effected from a traffic point of view.

Figure 2:
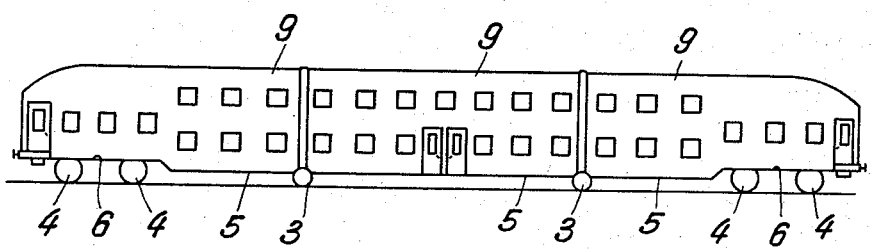
Fig. 2 is a side elevation of an articulated multi-section train according to the invention, constructed as a double decker for passenger transport.

As, as has already been mentioned, a considerably greater constructional height is available in the rail vehicle according to the invention, double decker articulated passenger trains can be constructed as shown in Fig. 2, these trains consisting of individual sections 9 wherein it is not necessary, as hitherto, to raise the platform 5 in the vicinity of the sets of wheels. This measure is only necessary at the front and rear end sections of the train so as to allow the platform part 6 to extend over the larger runner wheels 4. The smaller runner wheels 3 do not interfere with the low platform which extends above the upper edges thereof or is only slightly raised at the points where the rims of the small runner wheels 3 are arranged. As shown in Figs. 5, 6 and 7, the wheels 3 and 4 are mounted on trucks which assume a radial position as the articulated train passes through a curved track portion. The smaller wheels 3 are mounted on trucks which are connected to the end portions of two adjacent sections 1, or to the end portions of an end section 2 and a section 1, as shown in Fig. 5. Two sections 1, and also sections 2 and adjacent sections 1 are connected by a joint as for example disclosed in German Patent 552,538 and in the Swiss Patent 253,860. Each section has at one end an eyelet 18, and at its other end a fork-shaped connecting member 19 having two aligned holes, and a connecting pin 20 passes through the holes in members 19 and 18 so that the sections can assume the position shown in Fig. 4.

As for example described in the German Patent 926,-914, each section has at the ends thereof spring brackets 11 to which spring shackles 12 are pivotally connected. The spring shackles 12 of two adjacent sections are connected to a leaf spring means 13 which is rigidly connected by a shackle to the bearing housings 15 in which the axles of the wheels 3 are mounted. Guide members 16 are fixedly secured to the bearing housings 15 and cooperate with holding members 17 rigidly connected to the ends of the respective sections. This arrangement permits a relative angular displacement between the adjacent sections, while the wheel shafts assume a radial position.

As further shown in Fig. 5 the larger wheels 4 are mounted at the ends of the sections 2. Each pair of wheels 4 is mounted on a shaft whose bearings 21 have spring shackles 22 embracing leaf springs 23. The raised end 6 of the end sections carries spring brackets 24 on which are mounted shackles 25 pivotally connected to the leaf spring 23. The axle holders 26 are fixed to the platform.

As shown in Fig. 2, two pairs of wheels are arranged under the raised end portions, and this construction is shown in detail in Fig. 7. On a truck 27 are mounted the bearings 28 which carry spring shackles 29 for holding leaf springs 30. The shackles 31 are connected to the leaf springs and are pivotally connected to the frame of the truck 27. The truck is mounted on the section for turning movement about a vertical axis 32.

Figure 3:
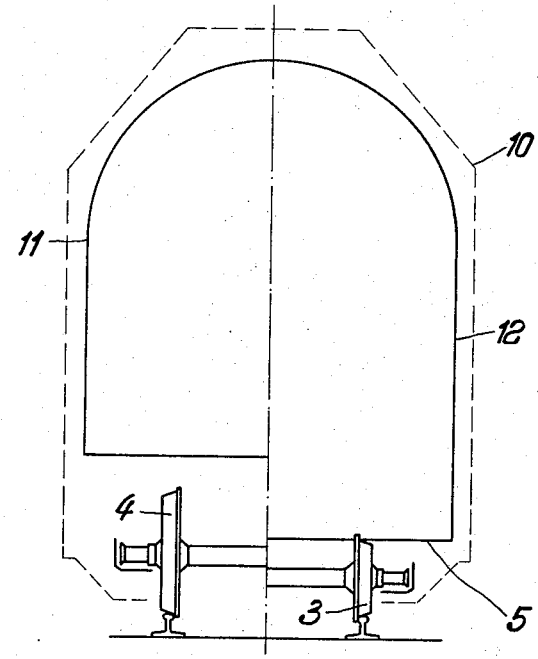
Fig. 3 is a diagrammatic view showing space gained by the train according to the invention.

Fig. 3 shows on the right the outline of a railroad car according to the present invention at 12, and the maximum permitted area designated by 10. On the left hand side of the figure the contour line 11 of a modern Pullman car with a floor height of 1230 millimeters and wheels 4 of standard diameter is indicated. On the right hand side the diameter of the wheels 3 and the height of the floor of the platform 5 is assumed to be 600 millimeters, with the result that it is necessary to provide recessed bulges 7 directly above the wheels. It is obvious that the arrangement is not only suitable for use on passenger cars or platform cars but can also be provided for other types, such as covered wagons, container cars or the like.

A comparison of the contour 12 of the car, rendered possible by this measure, with the contour 11 of the Pullman car, shows that a considerable gain in space, amounting for example to more than 20%, is attained.

The gain in height is also of great advantage as regards the loading of merchandise of great height without employing well wagons. This is necessary today when building so-call rolling highways for the conveyance of road vehicles (lorries and trailers) which have to be transported over long distances by rail. Whereas, for example lorries with the normal overall height of 3,500 millimeters with a normal platform height of 1230 millimeters can no longer be loaded because they project above the boundary line II of the car, this is easily possible in the case of the train according to invention with a floor height of 600 millimeters.

Moreover large standard containers which are loaded on low platform trains according to the invention, can be considerably increased in height until they reach the clearance gauge of the wagon, the result being a considerably increase in the volumetric capacity. The length of the train will consequently be utilized very much more effectively.

Another advantage derived from the arrangement is the possibility of more easily loading and unloading, for example, road vehicles on the low platform.

We claim:

1. A rail vehicle comprising a plurality of sections including two end sections, each section having a platform; means for articulating said sections to each other to permit relative angular movement of said sections about vertical axes; first wheel means including wheels having a diameter at least 10% smaller than the diameter of standard railroad wheels, said first wheel means being mounted on adjacent ends of adjacent sections, the platforms of said sections above said first wheels being lower than standard platforms; and second wheel means at the ends of said end sections remote from the ends of said end sections which are articulated to adjacent sections, said second wheel means being of standard diameter, and the platforms of said end sections being stepped and having a higher portion located above said second wheels, and a lower portion located above said first wheel means.

2. A rail vehicle comprising a plurality of sections including two end sections, each section having a platform; means for articulating said sections to each other to permit relative angular movement of said sections about vertical axes; first wheel means including wheels having a diameter of about 600 mm. so as to be at least 10% smaller than the diameter of standard railroad wheels, said first wheel means being mounted on adjacent ends of adjacent sections, the platforms of said sections above said first wheels being lower than standard platforms; and second wheel means at the ends of said end sections remote from the ends of said end sections which are articulated to adjacent sections, said second wheel means being of standard diameter, and the platforms of said end sections being stepped and having a higher portion located above said second wheels, and a lower portion located above said first wheel means.

3. A rail vehicle as set forth in claim 1 wherein said platforms above said smaller wheels are arranged substantially at the level of the uppermost points of said smaller wheels.

4. A rail vehicle as set forth in claim 1 wherein said platforms above said smaller wheels are arranged slightly lower than the uppermost points of said smaller wheels and are formed with raised portions above said smaller wheels to clear said smaller wheels.

5. A rail vehicle as set forth in claim 1 and wherein each of said sections includes a double decker railroad car, and wherein said lower platforms constitute the floors of said railroad cars.

References Cited in the file of this patent
UNITED STATES PATENTS

| | | |
|---|---|---|
| 488,255 | Shaw | Dec. 20, 1892 |
| 1,724,149 | Self | Aug. 13, 1929 |
| 2,030,010 | Liechty | Feb. 4, 1936 |
| 2,087,377 | Geissen | July 20, 1937 |